(12) United States Patent
Szeliski et al.

(10) Patent No.: US 8,610,741 B2
(45) Date of Patent: Dec. 17, 2013

(54) RENDERING ALIGNED PERSPECTIVE IMAGES

(75) Inventors: Richard S. Szeliski, Bellevue, WA (US);
Johannes P. Kopf, Bellevue, WA (US);
Michael F. Cohen, Seattle, WA (US);
Eric J. Stollnitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 985 days.

(21) Appl. No.: 12/476,810

(22) Filed: Jun. 2, 2009

(65) Prior Publication Data
US 2010/0302280 A1    Dec. 2, 2010

(51) Int. Cl.
*G09G 5/00* (2006.01)

(52) U.S. Cl.
USPC .......... 345/629; 345/660; 345/661; 345/662; 345/663; 345/672; 715/798; 715/799; 715/800; 715/801

(58) Field of Classification Search
USPC .......... 345/660–663, 672–678; 715/798–801
See application file for complete search history.

(56) References Cited

U.S. PATENT DOCUMENTS

| | | | |
|---|---|---|---|
| 6,415,227 B1 | 7/2002 | Lin | |
| 7,002,578 B1 | 2/2006 | Ritter | |
| 2003/0169286 A1* | 9/2003 | Misawa | 345/716 |
| 2005/0192924 A1* | 9/2005 | Drucker et al. | 707/1 |
| 2006/0115181 A1* | 6/2006 | Deng et al. | 382/284 |
| 2006/0214953 A1* | 9/2006 | Crew et al. | 345/660 |
| 2007/0204014 A1 | 8/2007 | Greer et al. | |
| 2008/0043020 A1 | 2/2008 | Snow et al. | |
| 2008/0051997 A1 | 2/2008 | Rosenberg | |
| 2008/0170804 A1* | 7/2008 | Zhang et al. | 382/284 |
| 2008/0291217 A1* | 11/2008 | Vincent et al. | 345/629 |
| 2009/0208062 A1* | 8/2009 | Sorek et al. | 382/107 |
| 2009/0240431 A1* | 9/2009 | Chau et al. | 701/208 |
| 2012/0133639 A1 | 5/2012 | Kopf et al. | |
| 2013/0106990 A1 | 5/2013 | Williams et al. | |
| 2013/0155047 A1 | 6/2013 | Williams et al. | |
| 2013/0155180 A1 | 6/2013 | Wantland et al. | |

OTHER PUBLICATIONS

Gonzalez, Nick, "Google Maps Now with 360 Streetside Views", May 29, 2007, pp. 1-3, http://www.techcrunch.com/2007/05/29/google-maps-now-with-360-streetside-views/.

"Navigation System for Virtual Reality Visualization of Large-Scale Datasets", http://www.urop.uci.edu/SURP/sample_proposals/SURP%20Engineering%205.pdf.

* cited by examiner

*Primary Examiner* — Ke Xiao
*Assistant Examiner* — Kim-Thanh T Tran
(74) *Attorney, Agent, or Firm* — Microsoft Corporation

(57) ABSTRACT

Techniques and systems are disclosed for navigating human scale image data using aligned perspective images. A consecutive sequence of digital images is stacked together by aligning consecutive images laterally with an image offset between edges of consecutive images corresponding to a distance between respective view windows of the consecutive images. A view window of an image in the sequence is rendered, where the view window of the image corresponds to a desired location. Offset portions of the view window of a desired number of images in the sequence are rendered, for example, alongside the full view of the image at the desired location.

20 Claims, 11 Drawing Sheets

RENDERING ALIGNED PERSPECTIVE IMAGES

BACKGROUND

Digital photography can allow for a sequence of images to be stitched or glued together to provide for a relatively seamless transition between perspectives of consecutive images from a common location. Often, users can collect digital images of a three-hundred and sixty degree view from a location, and stitch the images together to form a sort of panoramic image from that location. Further, images can be collected from a side-view while traveling along a route, such as a street. Stitching these side-view images together can provide a relatively seamless lateral-view of a traveled route from a sideways perspective.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A lateral-view of a panoramic image may comprise a series of photos stitched/glued together to form a somewhat seamless view of the lateral-view panorama. This type of lateral-view panorama typically shows all of the stitched together images all at once. Currently, images stitched together in this manner are utilized in conjunction with digital mapping services, where a user may view lateral-view panorama-type images of a street associate with a map they may be viewing. Moving laterally along a lateral-view panorama one might see some different perspective of objects in the panorama; however, there is no movement, as the image is static.

Further, some current systems merely display panoramic bubble-views from a location, in a type of three-hundred and sixty degree view from a location, comprised of stitched/glued together images. These systems typically allow a user to move from a view of one bubble to a view of its direct neighbors. However, this type of navigation is limited because if a user searches for a specific location, such as from a mapping service, the location may not be visible from a given bubble-view. Further, the user may need to take many steps to go from one end of the road to the other end, thereby necessitating movement from bubble to bubble.

Techniques and systems are disclosed for navigating image data sets, such as consecutive sequences of panoramic bubble-view images, by representing the data set in an alternative approach that allows for easier navigation. Further, the techniques and systems provide for more natural representation of objects in the views, in a three-dimensional-type perspective, and also provides a parallax movement in the perspective of objects in the images. Additionally, transitions between a panoramic bubble-view and a panoramic lateral-view are provided.

In one embodiment, a consecutive sequence of digital images, such as panoramic bubble-view images, can be stacked together. Stacking the images can comprise aligning consecutive images laterally having an image offset between edges of consecutive images, where the offset amount corresponds to a distance between respective view windows of the consecutive images. For example, were images are collected every two meters, the offset between images can be relative to the two meter distance in the view windows of the consecutive images. Further, a view window of an image in the sequence can be rendered, where the view window of the image corresponds to a desired location, such as a location chosen to be viewed by a user. Additionally, offset portions of the other images in the sequence can be rendered, corresponding to a desired number of images, such as those that fit within a display.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
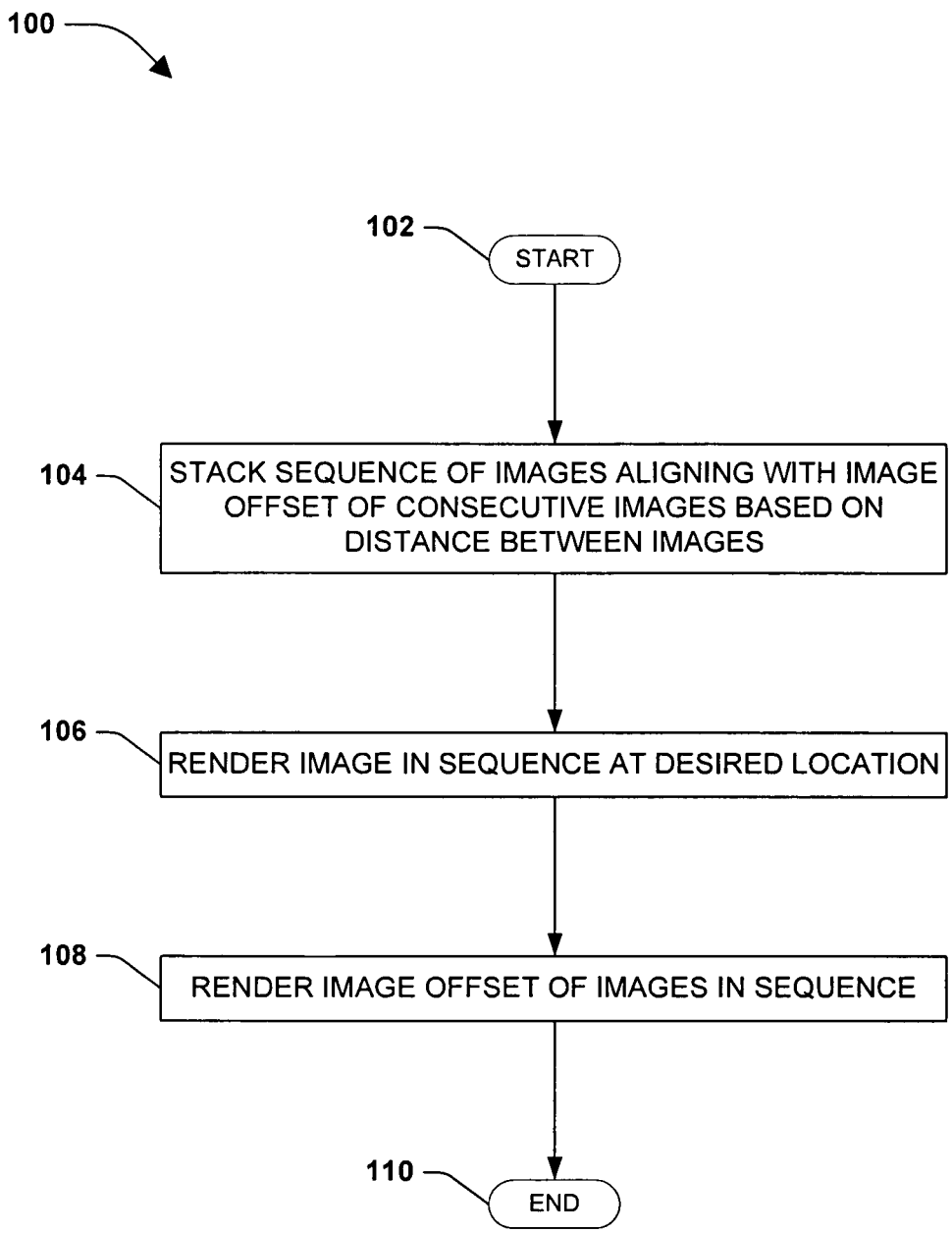
FIG. 1 is a flow chart diagram of an exemplary method for navigating human scale data using aligned perspective images.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that can provide for navigating images of a location in human scale datasets, such as panoramic bubbles that are collected of the location at short intervals showing street-level imagery. Navigating in human scale, where human scale can comprise street-level imagery, can allow the images of the location to be viewed as one might view the location while walking down a street, for example, turning around to view in a three-hundred and sixty degree scale, and viewing objects in the images with a natural three dimensional-type image perspective. FIG. 1 is a flow chart diagram of an exemplary method 100 for navigating human scale data using aligned perspective images.

The exemplary method 100 begins at 102 and involves stacking a consecutive sequence of digital images (e.g., digital photographs), which comprises aligning consecutive images laterally with an image offset between edges of the consecutive images that corresponds to a distance between respective view windows of the consecutive images, at 104. As an example, in the exemplary embodiment 400 of FIG. 4, a consecutive sequence of images 402 (1 through 16) has been stacked where image number 9 is situated on top of the stack (e.g., exposed in full view).

In this exemplary embodiment 400, the images are of approximately a same dimension, comprising a view of a location at desired intervals (e.g., two meters). Further, the images 1 through 8 are stacked underneath number image 9 to the left, and images 10 through 16 are stacked under image number 9 to the right. Additionally, the images stacked underneath image number 9 are offset 418 from the image on top and from each other, where the offset corresponds to the desired interval (e.g., two meters) as viewed in the images.

Returning to FIG. 1, at 106, the exemplary method 100 comprises rendering a view window of an image, where the image's view window corresponds to a desired location. For example, image number 9 in the exemplary embodiment 400 comprises the image that is rendered on top of the stack of consecutive images 402. In this example, image number 9 in the sequence 402 corresponds to a desired location 404, such as a segment of the sequence that a user desires to view. Therefore, in this example, the entire view of image number 9 can be viewed by the user, corresponding to their desired location.

At 108, in the exemplary method 100, the image offset portion of the view window of a desired number of images in the sequence is also rendered. For example, in the exemplary embodiment 400, image number 9 is viewed entirely, while merely the offset portion of the remaining images is rendered for the sequence, to be viewed by the user. In this way, for example, a view of the sequence 402 from the desired location 404 can comprise a continuous lateral view of a desired area, such as one side of a street, where an entire view of the image at the desired location is rendered, and merely offset portions 418 of the remaining images are rendered at desired intervals.

Having rendered the sequence of consecutive images, the exemplary method 100 ends at 110.

In one embodiment, the consecutive sequence of images can be aligned along a top and bottom edge of the respective images. For example, where the sequence is collected from a series of digital photographs taken at desired images from a same distance and height, aligning the top and bottom of the images can allow for stitching together the views smoothly. Further, in this embodiment, stacking the images in the sequence can comprise aligning objects in the images that traverse consecutive images. For example, where two consecutive images both capture a same portion of a same building, the images can be aligned based on details from the building so that they can be stitched together while mitigating viewable seems between the images.

In one embodiment, the consecutive images in the sequence can comprise perspective from desired location at a desired distance from each other. For example, one may collect digital photographs of a view of one side of a street as they travel down that street. The photographs can be collected a desired intervals, such as every two meters, from a similar height and a similar distance from the side of the street, pointing in a same direction (e.g., a camera can be mounted on a vehicle to collect photographs of a right side of a street, as it is driven down the street in a right hand lane).

In this example, respective photographs comprise the perspective of the side of the street from the location where the photograph is taken. In this way, a first photograph may capture a front of an object, and a consecutive photograph taken from a desired distance may capture a portion of a side of the object, for example. In this embodiment, when these images are stitched together, a natural three-dimensional type perspective can be rendered to a viewer of the sequence.

In one embodiment, representations of edges of images in the stacked sequence can be rendered. For example, a sequence of consecutive stacked images can be viewed as a lateral perspective of a location, comprising images from the sequence stitched together to provide a relatively seamless view. In this embodiment, as seen in the sequence 402, of FIG. 4, edges of the respective images can be rendered in the view, for example, to delineate boundaries of the images.

In one embodiment, a sequence of stacked images may comprise a desired number of selected images. For example, as described above, a sequence of consecutive images can be collected from a vehicle mounted camera as the vehicle travels down a street. In this example, the camera may be programmed to collect an image based on a vehicles speed, timing, distance, or a combination of these. Occasionally, consecutive images may overlap each other by more than a desired offset threshold, such as merely having an offset of half a meter where the threshold is one to three meters. In this embodiment, images that fail to meet an offset threshold can be discarded from the stack, and merely a desired number of images can be selected, such as those meeting the threshold.

In one aspect, collecting a sequence of images may comprise collecting panoramic bubble-views, such as three-hundred and sixty degree views, from a desired location. In this way, in one embodiment, the digital images in the sequence can comprise a panoramic bubble-view from the desired location. For example, in the exemplary embodiment 500 of FIG. 5, a sequence of panoramic bubble-views 504 can be stacked, such as was done for the lateral-view images in FIG. 4. In one embodiment, the panoramic bubble-view images can be stacked using an offset 508 for aligning consecutive images in the sequence. In this embodiment, the offset 508 can correspond to a desired distance between consecutive panoramic bubble-view images.

In another embodiment, the view window of an image in a sequence, such as a lateral-view, can comprise a cropped portion of the panoramic bubble-view from a desired location rendered as a perspective projection. For example, in FIG. 5, the sequence of panoramic bubble-view images 504 may represent a top-down view of the respective images 1 through 9, which have been collected in sequence while traveling in a line from 1 to 16.

In this example 500, a cropped portion of the panoramic bubble-view images can be rendered for the respective sideways lateral-views 502 and 506 of the sequence of panoramic bubble-view images. Respective cropped view images can be stacked in a same sequence as the panoramic bubble-view images, for example, as shown in the sequences 502, 504, and 506, where images 9A, 9, and 9B represent the image displayed from a desired location. In this way, for example, a display may render a view of a street ahead, as a user moves through the images, and views of details on either side of the line of travel, creating a continuous panoramic view in human scale (e.g., street-level).

Figure 2:
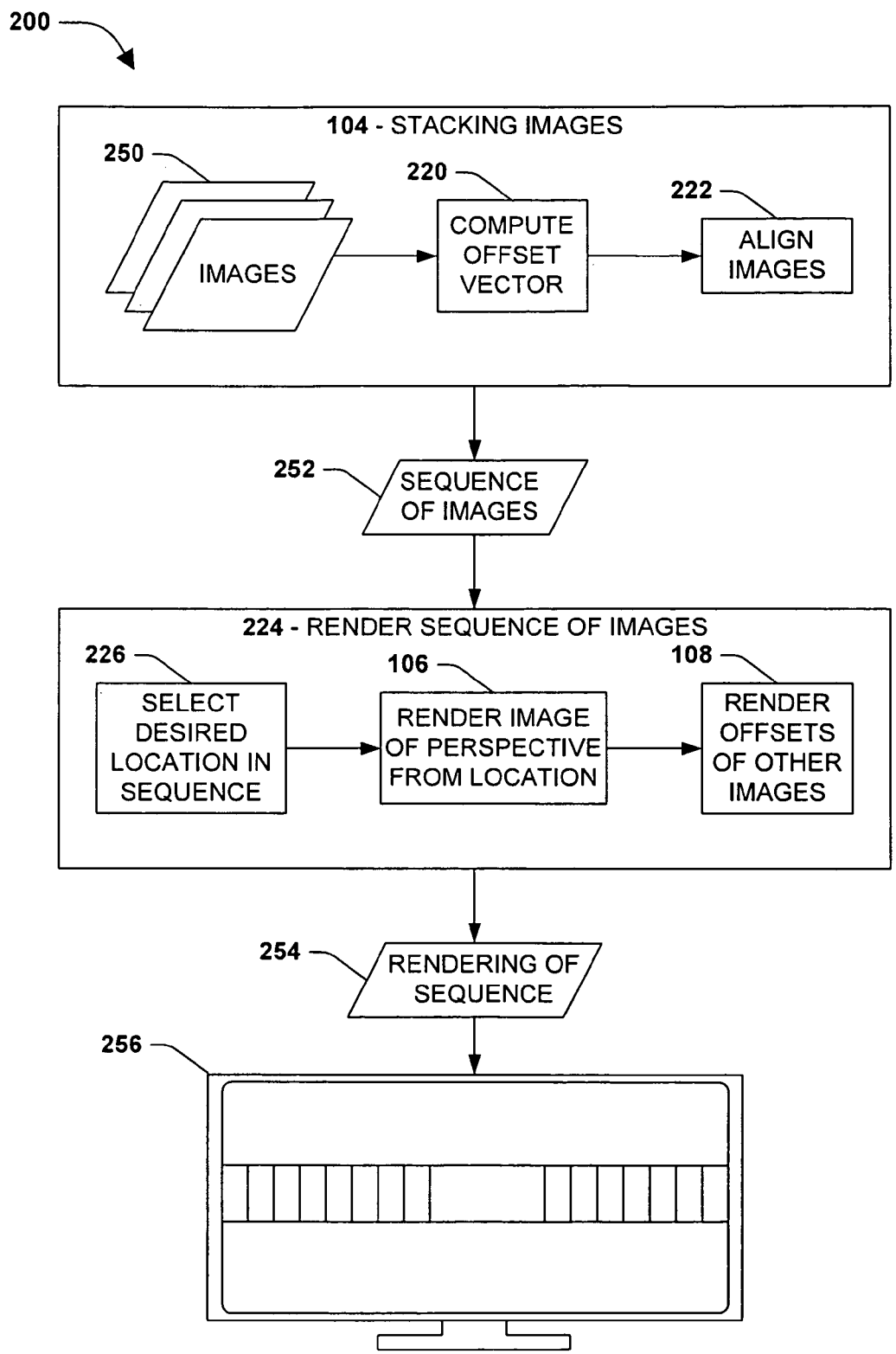
FIG. 2 is a flow chart diagram illustrating one embodiment of rendering a sequence of stacked images.

FIG. 2 is a flow chart diagram illustrating one embodiment of rendering a sequence of stacked images. At 104, in order to stack a sequence of images 250, an offset vector can be computed based on a location distance between consecutive images in the sequence. As described above, images in the sequence may be collected at desired distances from each other. The offset vector can be calculated by determining the desired distance between the consecutive images in the sequence. In one embodiment, the offset vector may correspond to the desired distance, which may be similar or different for respective images in the sequence.

In one embodiment, the offset vector can be computed based on a view distance to objects in scenes in the images from a point of view of the desired location (e.g., from a cameral). In this embodiment, images can be viewed from different distances from objects that are found in scenes of the images. For example, a virtual camera may comprise a desired location, which can be moved toward and away from the objects in the images.

At 222, the images in the sequence are aligned. As an example, in FIG. 4, the images can be aligned according to the offset vector, creating an image offset 418 between respective images in the sequence. Further, images may be aligned at a top and bottom of the images, and/or according to features from object in images that may traverse consecutive images, to generate a sequence of stacked and aligned images 252.

At 224, in order to render the sequence of images 252, a desired location in the sequence is selected, at 226. For example, in FIG. 4, the desired location 404 is selected, which can correspond to a location a user wishes to view. At 106, an image of a perspective from the desired location is rendered, such as for image number 9 in the sequence 402, of FIG. 4. Further, the offset views of the remaining images in the viewable sequence are rendered, at 108. For example, FIG. 4, the offset views for the images 1 through 8 and 10 through 16 can be rendered on either side of image number 9. In this exemplary embodiment 200, the sequence of viewable images 254 is rendered on a display 256, viewable by a user, for example.

Figure 3:
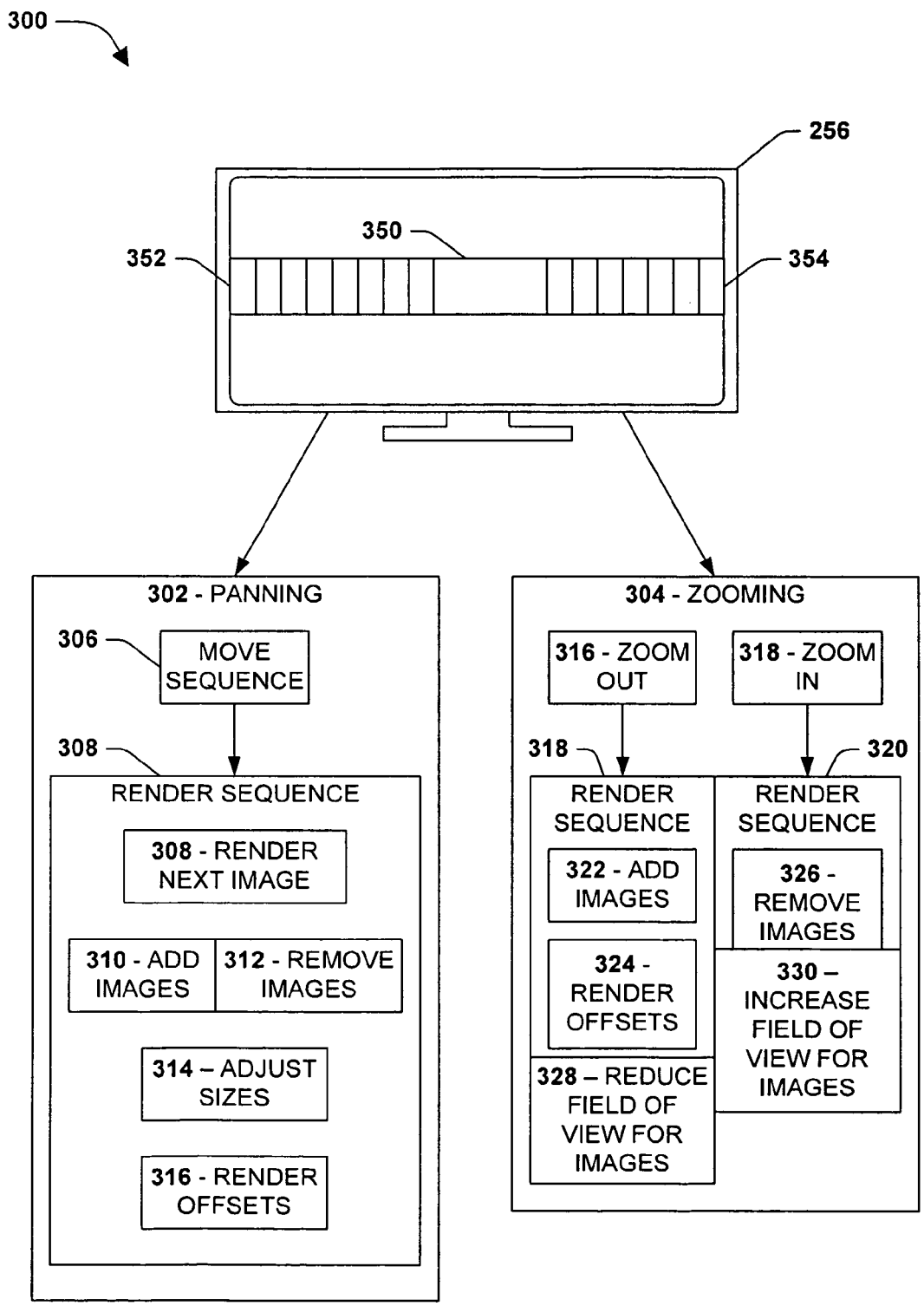
FIG. 3 is an illustration of an exemplary embodiment where a sequence of images can be panned and zoomed.

FIG. 3 is an illustration of an exemplary embodiment 300 where a sequence of images can be panned and zoomed. A display 256, such as a computer display, displays a sequence of images 350 in lateral-view, comprising a left 352 and right 354 side of the sequence. In this embodiment, the lateral-view can be panned 302 by sliding the sequence 350 left and right, for example, and zoomed into or out from 304 the lateral-view.

At 302, in order to pan the lateral-view, the sequence 350 is moved at 306. For example, the sequence 350 can be slid from left to right and from right to left (e.g., by mouse clicking on the sequence and dragging the mouse left or right). When panning 302, the view window of a next consecutive image in the sequence 350 is rendered, where the next image corresponds to a direction the sequence 350 is panned from the desired location. Further, the view window of the next consecutive image in the sequence 350 is rendered when the rendering of the sequence 350 corresponds to a next image position in the sequence.

Figure 4:
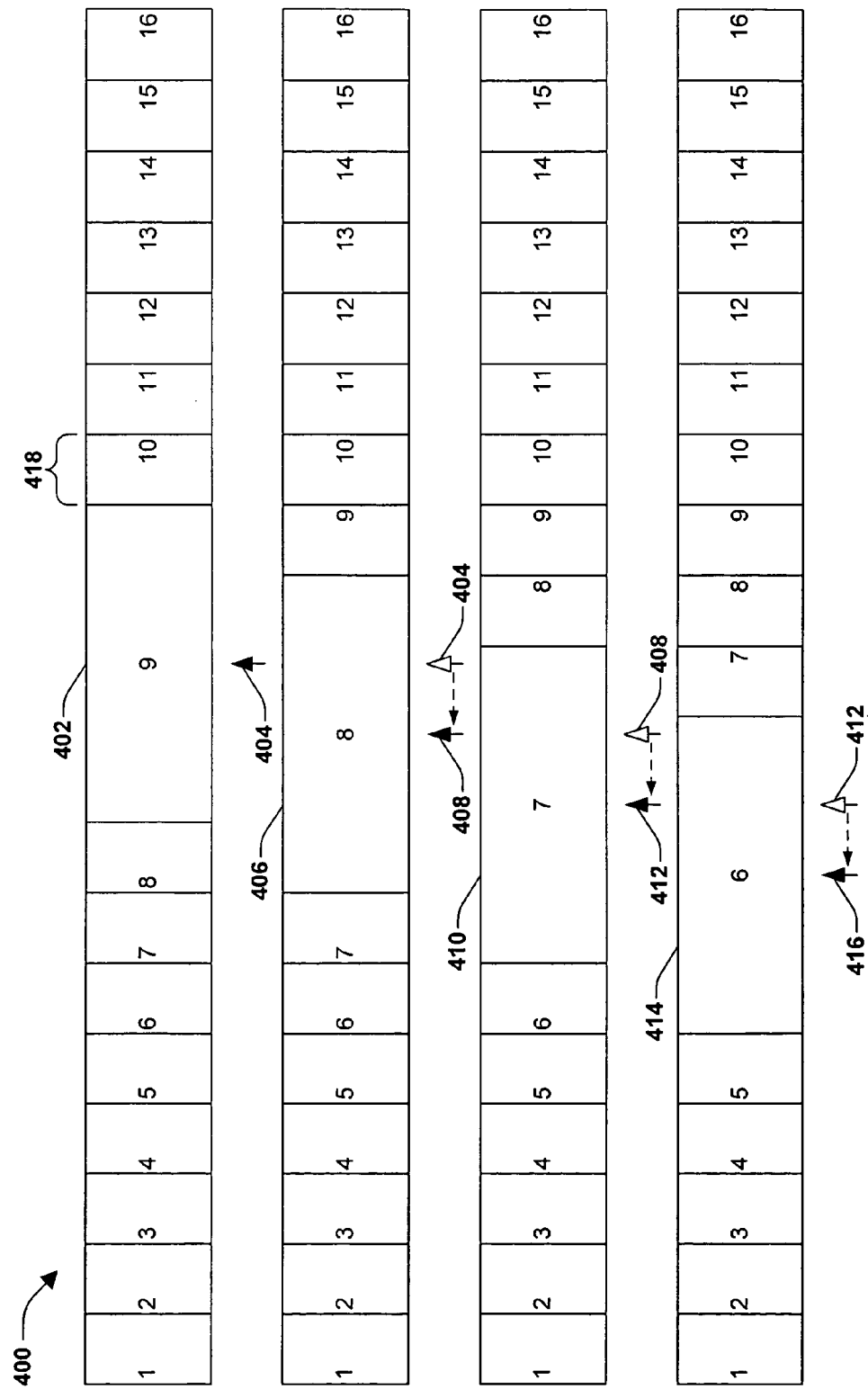
FIG. 4 is an illustration of one embodiment of stacking images in accordance with techniques disclosed herein.
Figure 5:
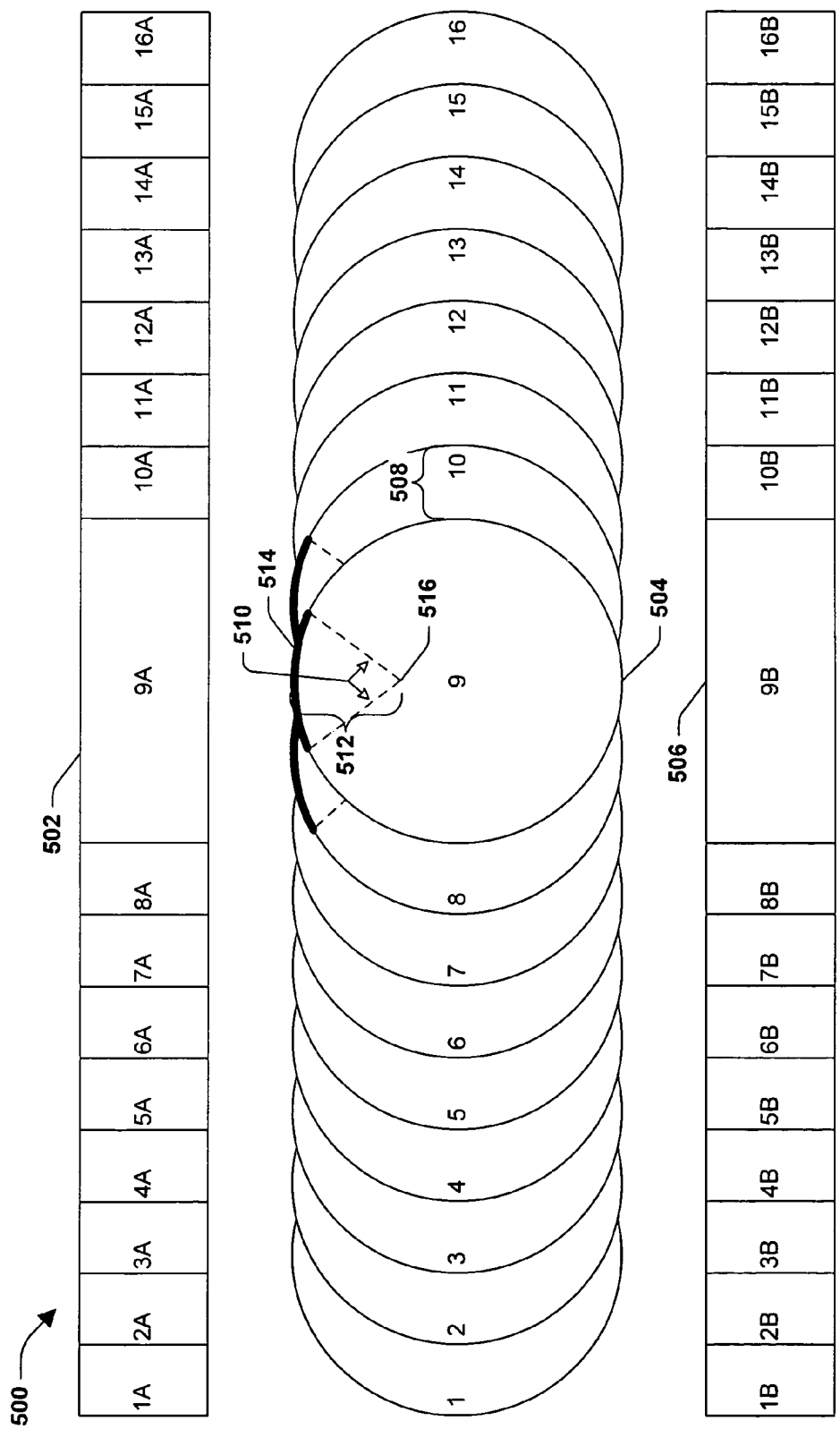
FIG. 5 is an illustration of another embodiment of stacking images in accordance with techniques disclosed herein.

For example, in FIG. 4, when panning from the location 404 to the location 408, image number 8 is rendered in full view and merely the offset portion of image number 9 is rendered, in sequence 406. As the sequence is panned further from the location 408 to 412, in sequence 410, and again from 412 to 416, in sequence 414, the images at the pan location are rendered in full view and merely the offset portion of the other images are rendered.

Returning to FIG. 3, panning the rendering of the sequence 350 can comprise adding images to the rendering of the sequence of stacked images at a first end of the sequence opposite of the lateral direction, at 310, and removing images from the rendering of the sequence at a second end of the sequence corresponding to the lateral direction, at 312. For example, if the sequence 350 were panned toward the left side 352, so that a center of the view of the sequence 350 comprises a view of the image rendered in full, images can be added to the right side 354 in the stack, and removed from the left side 352 from the stack.

At 314, the view window of the image rendered for the desired location can be adjusted according to a view distance from objects that can be found in image scenes (e.g., to account for different distances a camera may have been from an object when respective images of the object are acquired). Further, the size of the adjacent view windows can be adjusted in accordance with the view distance. For example, view windows of images can comprise merely a portion of the image, where the portion comprises a field of view from a view distance. In this example, an image view window from the desired location (e.g., 404 showing image 9 of 402, in FIG. 4) may comprise a smaller view angle (e.g., field of view) than adjacent image view windows (e.g., images 8 and 10 of 402, in FIG. 4), which can have wider view angles. In this way, for example, the image viewed at the center of the sequence is changed according to the direction of panning, and the field of view can be adjusted to account for a parallax effect from various view distances. Offset views of images are rendered at the first side, at 314, and removed from the second side.

At 304, zooming can comprise zooming out from the view of the sequence 350 of images, at 316, and zooming into the view of the sequence 350 of images, at 318. In one embodiment, zooming can comprise changing the view distance from the desired location to objects in the image scenes. As described above, for example, a virtual camera can move toward the objects or away from the objects, essentially "dollying" the view distance for the virtual camera.

Zooming out the rendering of the sequence, at 318, can comprise rendering the image offset portion of a higher number of images in the sequence, where the higher number of images corresponds to a zoom level. Therefore, in this embodiment, when zooming out, images are added to the stack at either side 352 and 354 to accommodate the zoom level. Further, the offset portions of the added images are rendered in the sequence, at 324.

Zooming into the rendering of the sequence, at 320, can comprise rendering the image offset portion of a lower number of images in the sequence, the lower number of images corresponding to the zoom level. Therefore, in this embodiment, as the sequence 350 is zoomed into, images can be removed, at 326, from both sides of the rendering of the sequence 354 and 352, according to a level zoomed into. In one embodiment, the rendering of a lateral-view of the sequence can be enlarged to accommodate the zoom level, while the offset portions of the images at either end 352 and 354 are no longer rendered in the view display 256.

At 328, zooming out can comprise reducing a field of view of the images rendered 350 in the display 256. For example, in FIG. 5, a display may comprise a lateral view of the sequence 502, with a desired location corresponding to the image 9A. In this example, the rendered images in the lateral view 502 can comprise portions 514 of panoramic bubble-view images 504. In this example, the portion 514 of the bubble image 504 that is display in the lateral view 502 corresponds to a view angle 510 (e.g., field of view). The view angle can be determined, for example, by the view distance 512 from the view perspective point 516 to objects in the image scenes, for example, as viewed from a virtual camera moving (or "dollying") in and out of the image.

Figure 6:
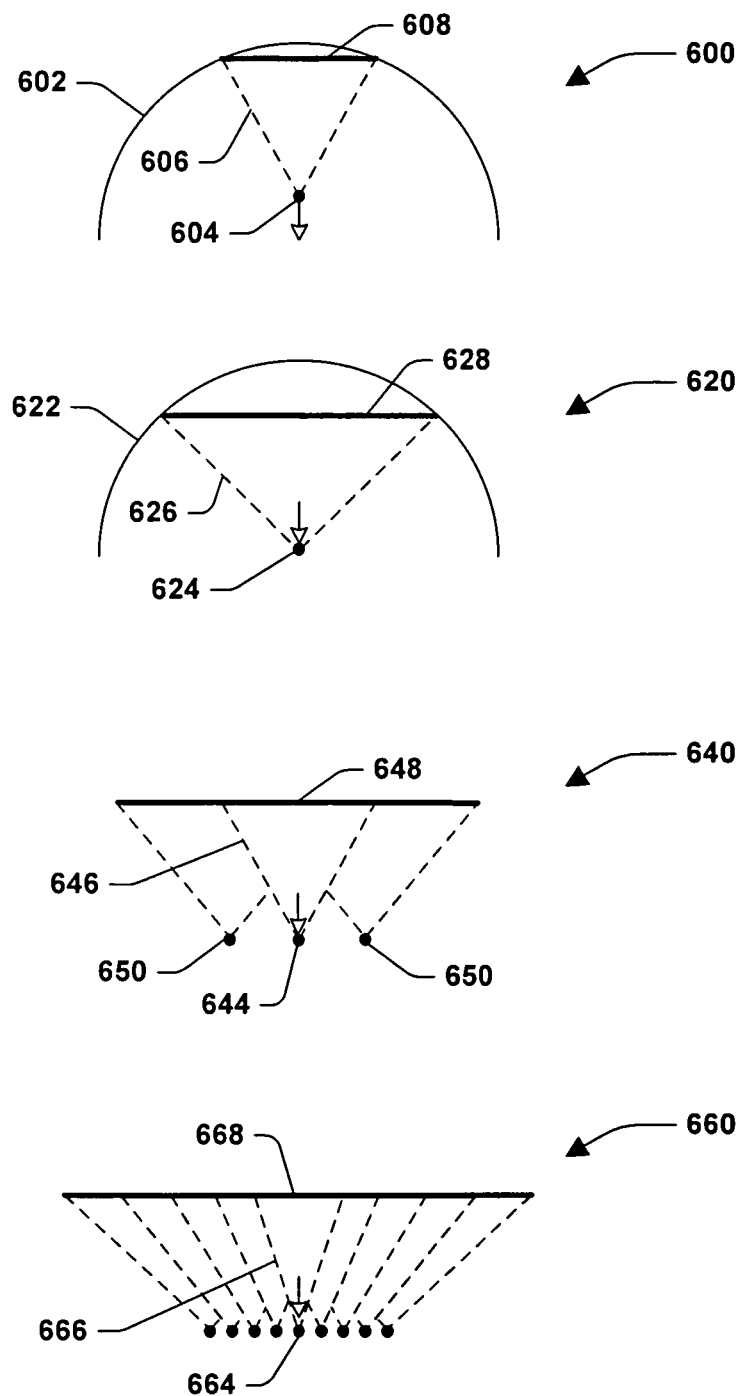
FIG. 6 is an illustration of exemplary embodiments where a rendered view of combined images are zoomed out.

In this embodiment, when the image sequence is zoomed out, the view distance 512 can be increased (e.g., the view perspective point is moved back 516). Further, when the image sequence is zoomed in, the view distance 512 can be decreased. As an example, in FIG. 6, 600, the image's view window 608 comprises a portion of the bubble-view image 602, determined by the view location 604 and field of view 606. As the view location 624 is moved back, in 620, the field of view 626 increases in size to accommodate a zoomed out view 628 of a portion of the bubble-view image 622, for example.

In this embodiment, continually increasing a field of view can distort the view window at the edges of the image view, for example. Therefore, when the field of view exceeds a desired view angle (e.g., one-hundred and ten degrees), as in 640, adjacent image offsets 650 can be rendered with the central image 648 to accommodate the zoomed out viewpoint 644, for example. In this example, the view angle 646 for the image rendered at the desired location 644 can be reduced to accommodate the parallax effect that can occur when zooming out. Further, when the view distance is increased, as in 660, additional adjacent image offsets can be rendered. In this example, the image view 668 from the desired location 664 is further reduced, as the view angle 666 is reduced for the central image, and adjacent images to account for the parallax effect.

In one embodiment, zooming in can comprise transitioning from a rendering of the lateral view of the sequence at a desired location to a rendering of the panoramic bubble-view from the desired location. For example, in FIG. 5, in one embodiment, when lateral view of the sequence 502 is zoomed into, the view can transition from the lateral-view of the sequence 502 to a panoramic bubble-view of the image number 9, in the panoramic bubble-view 504. In this way, for example, a user may see an overview perspective of one side of a street in a zoomed out view, and then zoom into the image 9A to transition to a more detailed and three-hundred and sixty degree panoramic view of the image number 9 at that desired location.

Further, zooming out can comprise transitioning from the rendering of the panoramic bubble-view from the desired location to the rendering of the lateral view of the sequence at a desired location. For example, one may step through a sequence of panoramic bubble-views, such as 504 in FIG. 5, to see details and the three-hundred and sixty degree panoramic views, and then zoom out to see an overview of the area in a lateral-view, such as 502. That is, in this example, zooming out comprises going from a bubble-view to a lateral view, and zooming in comprises going from a lateral view to a bubble-view.

In one embodiment, transitioning can comprise mapping between image objects in the rendering of the lateral view of the sequence at a desired location and the rendering of the panoramic bubble-view from the desired location. For example, in order to provide a type of seamless transition between the panoramic bubble-view and the lateral-view of the sequence, details of objects in the images that traverse the images can be mapped between the images, and be used to provide for image stitching when transitioning between the two perspectives.

Figure 7:
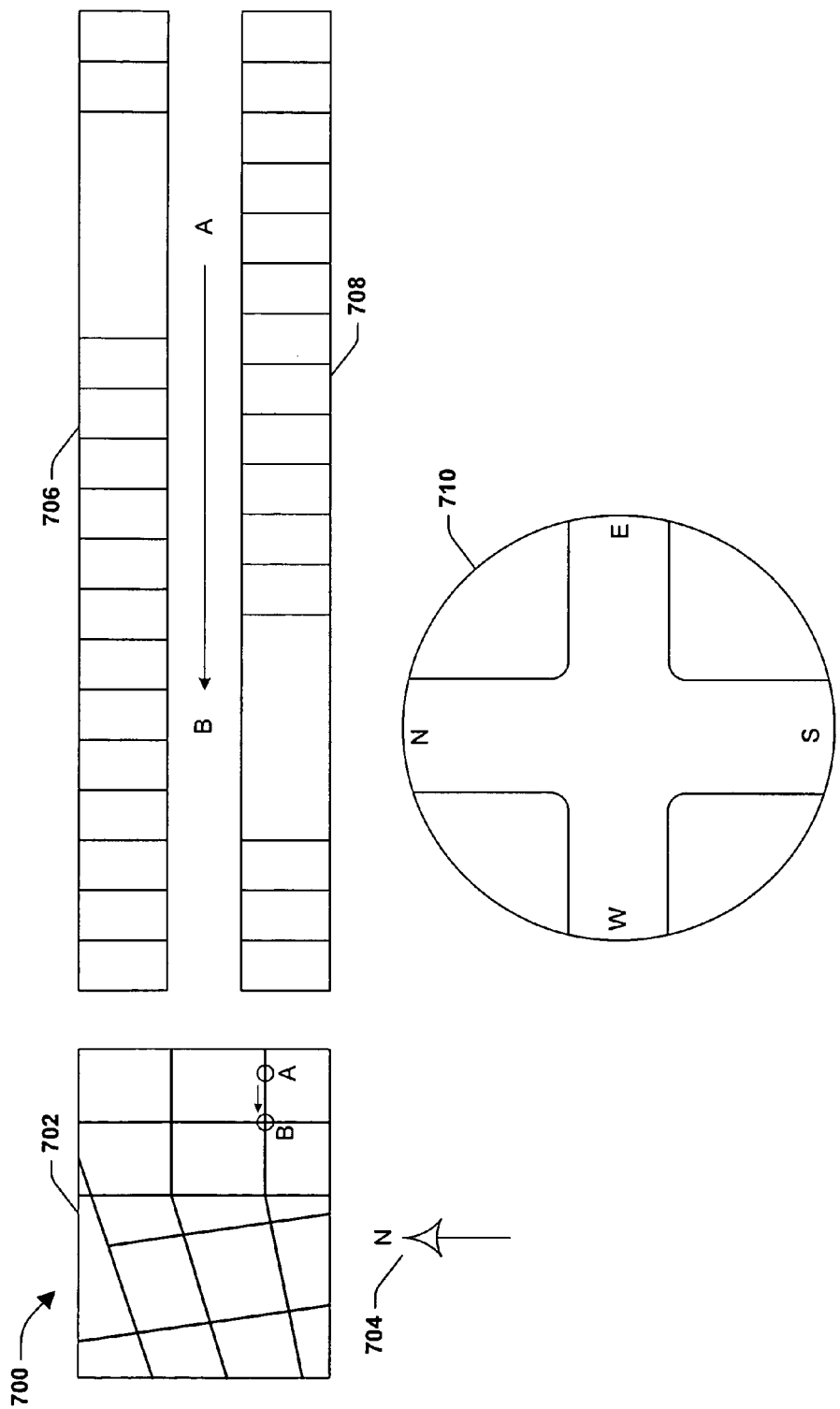
FIG. 7 is an illustration of an exemplary embodiment where human scale data using aligned perspective images can be utilized.

In one aspect, the smooth transitions can be appreciated when transitioning between streets at an intersection, for example. In one embodiment, the stacked sequence of consecutive images may comprise a view of roadways, for example, from a map. FIG. 7 is an illustration of an exemplary embodiment 700 where human scale data (e.g., street-level imagery) using aligned perspective images can be utilized.

In an overview map 702 a user may wish to view images of the roadway when moving from point A to point B, where north is indicated 704. In this example, the user may view a sequence of stacked images 706 of either side of the street, as they pan from point A to point B. Upon reaching point B in the sequence 708, an intersection is indication in the map overview 702. In this embodiment 700, the user may wish to begin moving (panning) down one of the intersecting streets (either heading north or south) at point B. The rendered view of the images can zoom in and transition to the panoramic bubble-view 710 of the intersection. At which point, the user may move the rendered view around the panorama 710 to view various areas of the intersection, and/or begin moving north or south down the intersecting roadway, for example, transitioning back to a lateral-view. It will be appreciated that such transition (from a lateral view (e.g., 708) to a bubble view (e.g., 710)) can occur somewhat automatically when a user encounters an intersection. For example, when a user clicks on the intersection, a transition from lateral view to bubble view may occur.

In one aspect, a rendering of a lateral-view of a sequence of images comprise a view of one side of the line of travel of the sequence, such as down a street. In this aspect, a user may wish to switch their view to a rendering of the opposite side of the street, for example. In one embodiment, switching lateral views can comprise transitioning between a rendering of a first lateral view of a first sequence (e.g., one side of the street) from a desired location to a rendering of a second lateral view of a second sequence (e.g., the other side) from the desired location, where the first sequence represents a different perspective from the desired location than the perspective of the second sequence. In one embodiment, the transition between the rendering of the sequence may comprise zooming into a panoramic bubble-view from the desired location, and panning around the bubble-view to the other side, then zooming out the lateral-view of the other side.

In one aspect, navigating human scale data using aligned perspective images can be utilized in digital maps, such as online or in a vehicle navigation system. In this aspect, one may wish to identify particular objects, street addresses, street names, and other locations. In one embodiment, annotations can be rendered along with the sequence of images, where the annotations correspond to areas in the images of the sequence. The annotations can comprise a descriptor for a street address, an object identifier (e.g., point of interest, historical marker), a location identifier (e.g., a retailer, or building name), and a street name. In one embodiment, a user may merely click on the annotation to zoom the rendering of the sequence into an image of the desired location marked by the annotation.

Figure 8:
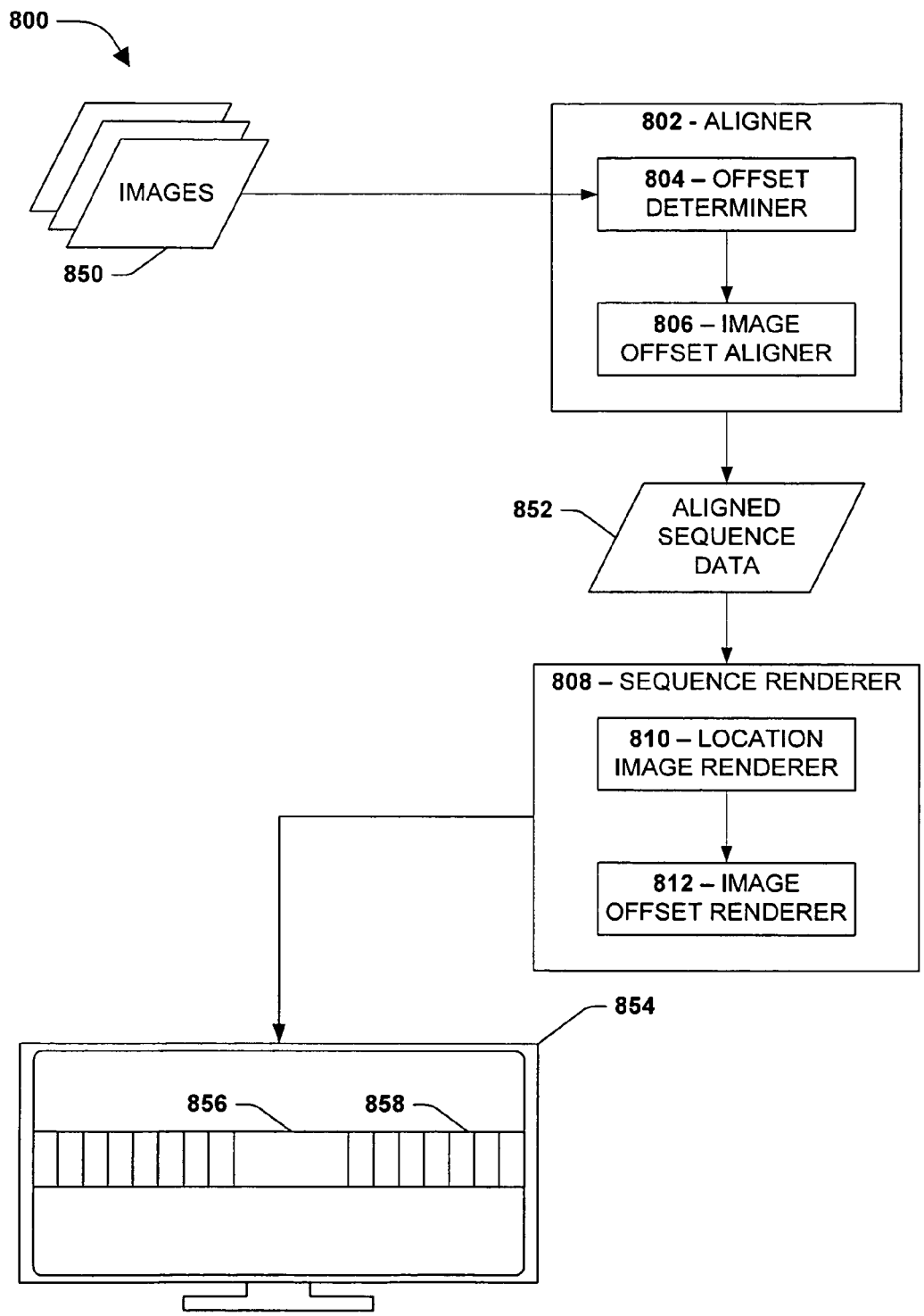
FIG. 8 is a component block diagram of an exemplary system for navigating human scale data using aligned perspective images.

A system may be devised that provides an immersive navigation experience of sequences of images that can represent a collection taken while traveling. FIG. 8 is a component block diagram of an exemplary system 800 for navigating human scale data, such as street-level imagery, using aligned perspective images. An image aligning component 802 can be configured to aligning a consecutive sequence of images 850 of perspectives at desired distances from each other.

The image aligning component 802 comprises an offset determination component 804 that is configured calculate an image offset vector between boundaries of consecutive images 850 that corresponds to a distance between desired locations of the consecutive images 850. Further, image aligning component 802 comprises an image offset alignment component 806, which is configured to align the consecutive images 850 at respective image offsets based on the image offset vector. The image aligning component 802 can generate data that comprises an aligned sequence of consecutive images 852.

A sequence rendering component 808 utilizes a location image rendering component 810, which is configured to render the image from a perspective of the desired location, and an image offset rendering component 812, which is configured to render the one or more image offset portions of the images from perspectives not from the desired location, to render the sequence of the consecutive images 852. In one embodiment, the sequence of images can be rendered on a computer display, where the image from the desired location perspective 856 is rendered in full view, and the offset portions 858 of the remaining images in the rendered sequence are also displayed.

Figure 9:
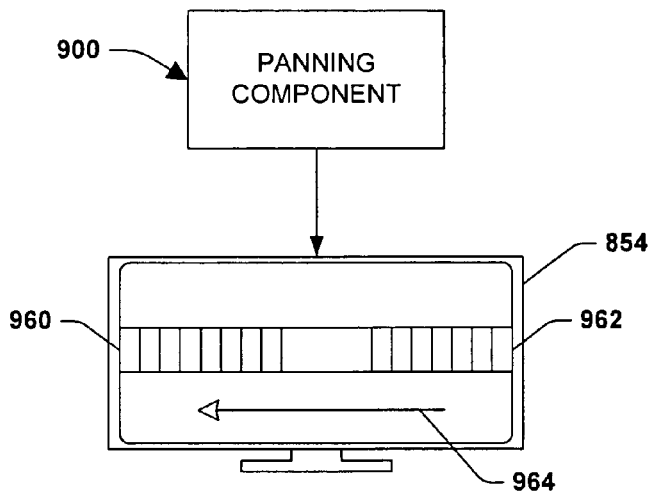
FIG. 9 is an illustration of an exemplary panning component utilized by the systems disclosed herein.

In one embodiment, a system for navigating human scale data using aligned perspective images may comprise a panning component. FIG. 9 is an illustration of an exemplary panning component 900. In this embodiment, the panning component 900 can be configured to render a next consecutive image in the sequence corresponding to a direction the sequence is panned. For example, where a lateral-view of the sequence of images is rendered in a display 854, the sequence can be panned 964 to the left 960 and right 962. In this embodiment, for example, when the sequence is panned left 964, the panning component is configured to "flip" out to a full view, the next image in the sequence to the left, and render merely the offset portions of the remaining images in the rendered portion of the sequence.

Figure 10:
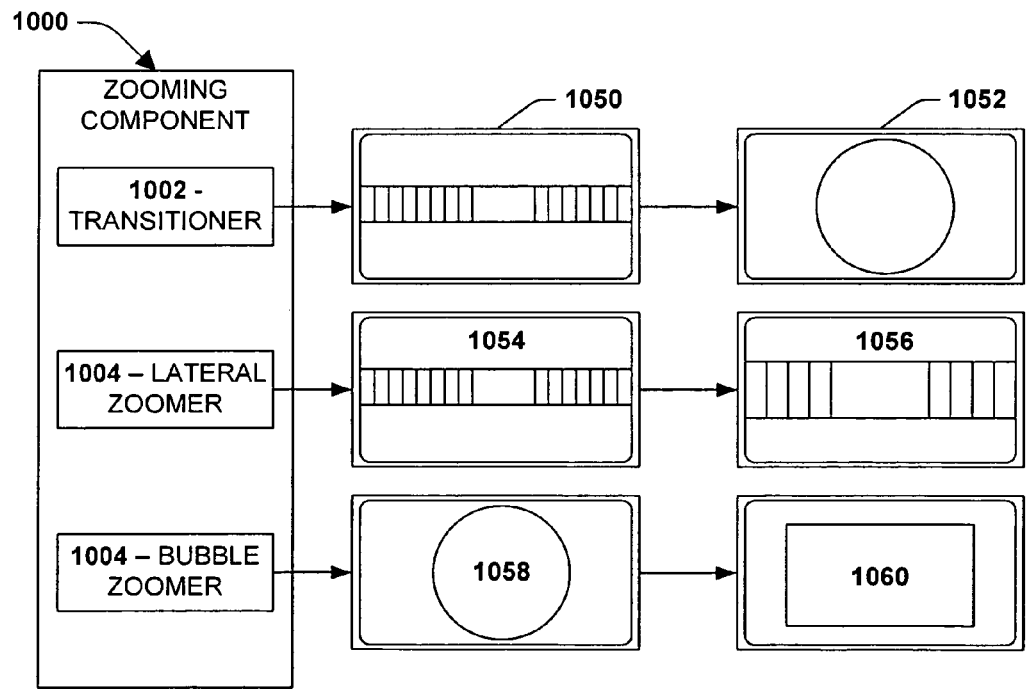
FIG. 10 is a component block diagram of an exemplary zooming component utilized by the systems disclosed herein.

In one embodiment, a system for navigating human scale data using aligned perspective images may comprise a zooming component. FIG. 10 is a component block diagram of an exemplary zooming component 1000. In this embodiment, the zooming component 1000 can comprise a transition component 1002 that is configured to transition between a lateral-view 1050 of the sequence and a bubble-view 1052 of the desired location. Further, the zooming component 1000 can comprise a lateral zooming component 1004 can be configured to zoom a rendering of the sequence in 1054 or zoom the rendering of the sequence out 1056.

Additionally, the zooming component 1000 can comprise a bubble zooming component 1004 can be configured to zoom in to a rendering of a bubble-view 1060 from a desired location or zooming out 1058 from a rendering of a bubble-view from a desired location. For example, a bubble-view 1058 can comprise a panoramic three-hundred and sixty degree view from a desired location, comprising views from the location stitched into a relatively seamless rendering. In this example, the bubble zooming component 1004 can be used to zoom into a portion of the bubble-view, to a detailed image of a particular portion 1060 of the three-hundred and sixty degree view.

Figure 11:
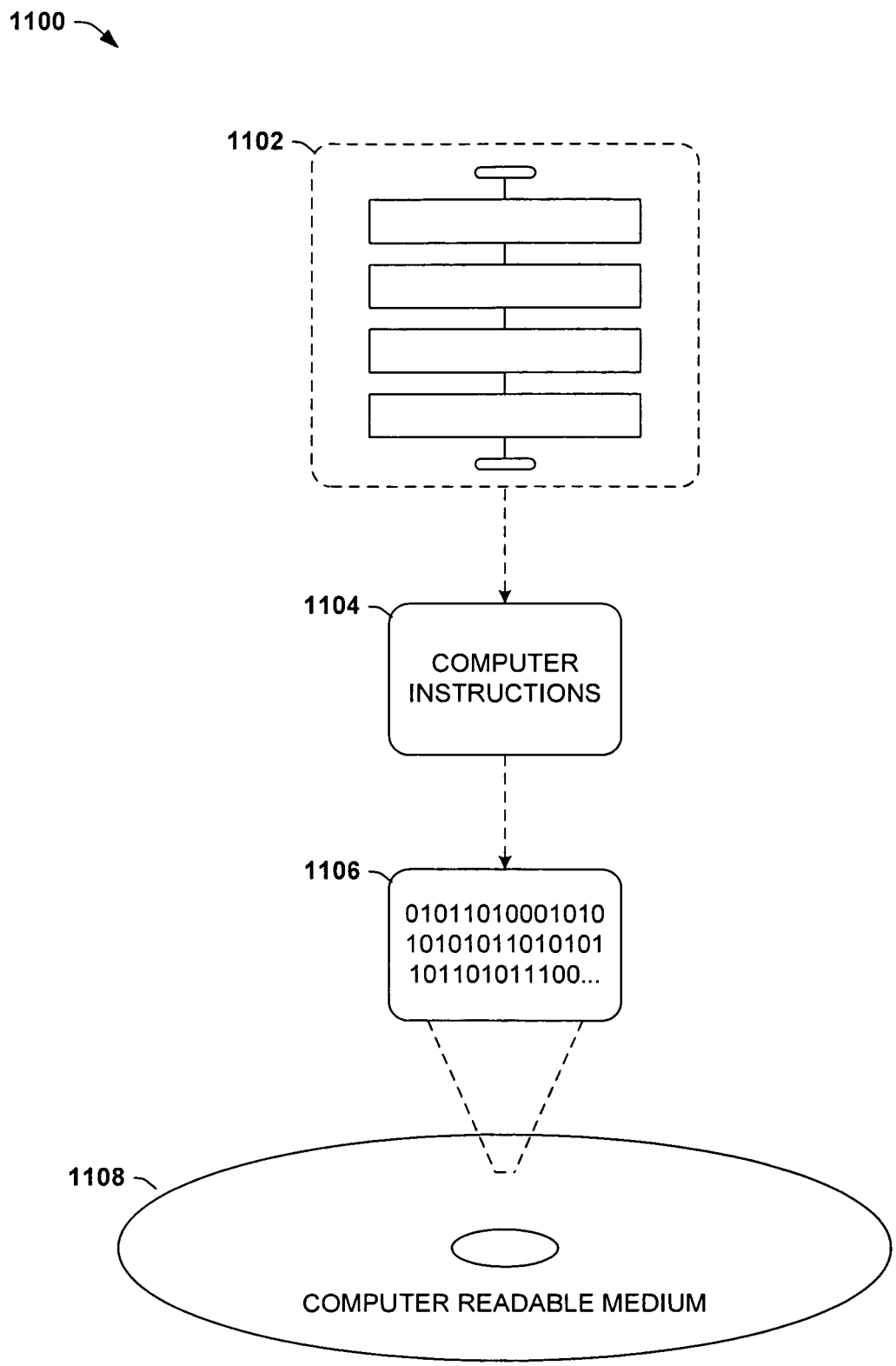
FIG. 11 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1108 (e.g., a CD-R, DVD-R, or a platter of a hard disk drive), on which is encoded computer-readable data 1106. This computer-readable data 1106 in turn comprises a set of computer instructions 1104 configured to operate according to one or more of the principles set forth herein. In one such embodiment 1102, the processor-executable instructions 1104 may be configured to perform a method, such as the exemplary method 100 of FIG. 1, for example. In another such embodiment, the processor-executable instructions 1104 may be configured to implement a system, such as the exemplary system 800 of FIG. 8, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
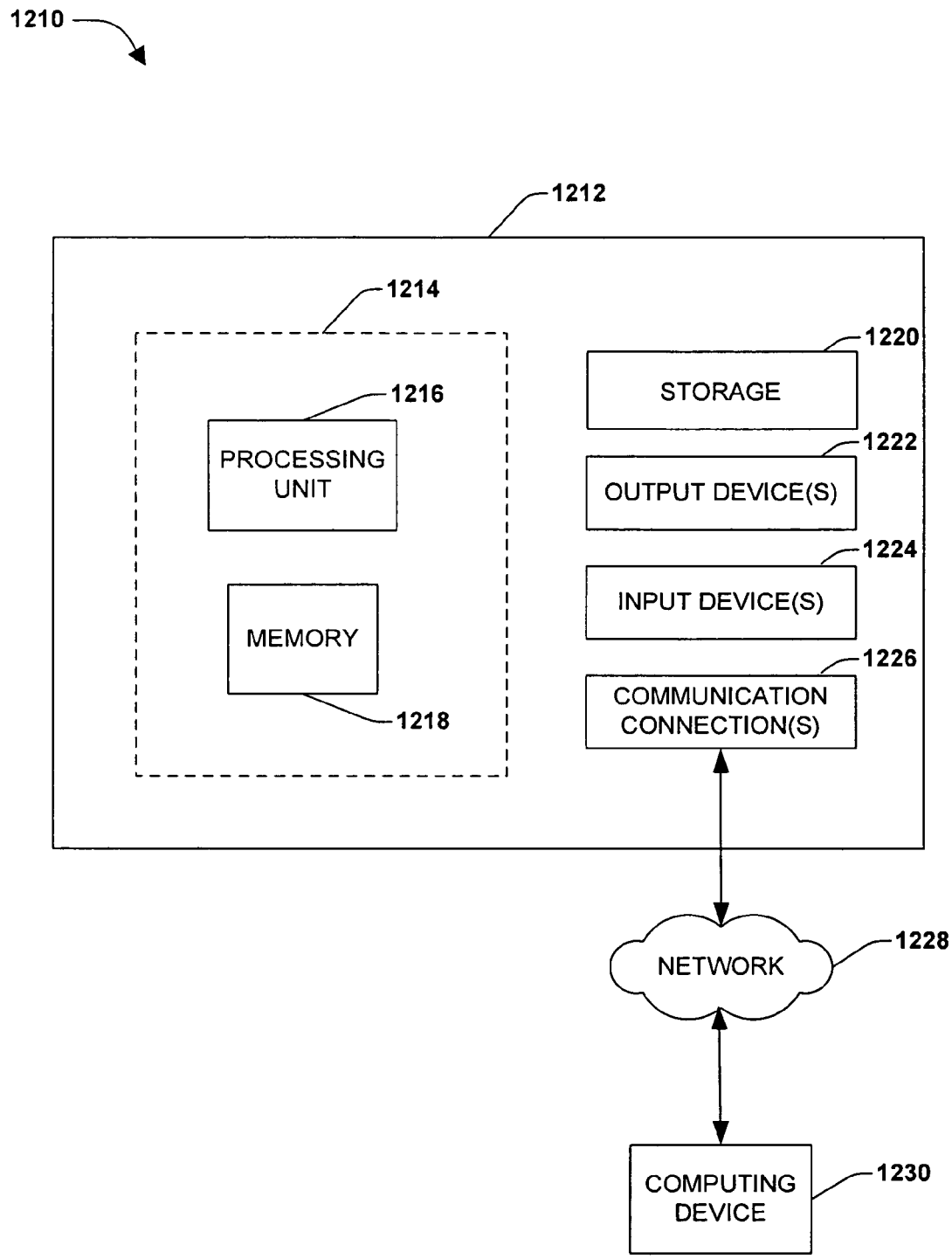
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for navigating image data, comprising:
   stacking a sequence of digital images comprising a first digital image and a second digital image, the first digital image corresponding to a first location and the second digital image corresponding to a second location;
   rendering a full view of the first digital image;
   rendering an offset portion of the second digital image, the offset portion of the second digital image based upon a distance between the first location and the second location; and
   panning to the second location, comprising:
      rendering a full view of the second digital image; and
      rendering an offset portion of the first digital image, the offset portion of the first digital image based upon the distance between the first location and the second location.

2. The method of claim 1, comprising panning to a third location to which a third digital image in the sequence of digital images corresponds, comprising:
   rendering a full view of the third digital image; and
   rendering a second offset portion of the second digital image, the second offset portion of the second digital image based upon a second distance between the third location and the second location, the second distance different than the distance.

3. The method of claim 1, the first digital image comprising at least some of an object, the second digital image comprising at least some of the object.

4. The method of claim 3, comprising aligning the first digital image with the second digital image based upon a feature of the object.

5. The method of claim 1, comprising at least one of zooming in to or zooming out of at least some of at least one of the first digital image or the second digital image.

6. The method of claim 5, at least one of the zooming in or the zooming out comprising changing a distance between a desired location and an object comprised in at least one of the first digital image or the second digital image.

7. The method of claim 1, comprising cropping at least some of at least one of the first digital image or the second digital image.

8. A system for navigating image data, comprising:
   one or more processing units; and
   memory comprising instructions that when executed by at least some of the one or more processing units, perform a method comprising:
      stacking a sequence of digital images comprising a first digital image and a second digital image, the first digital image corresponding to a first location and the second digital image corresponding to a second location;
      rendering a full view of the first digital image;
      rendering an offset portion of the second digital image, the offset portion of the second digital image based upon a distance between the first location and the second location; and
      panning to the second location, comprising:
         rendering a full view of the second digital image; and
         rendering an offset portion of the first digital image, the offset portion of the first digital image based upon the distance between the first location and the second location.

9. The system of claim 8, the method comprising aligning the first digital image with the second digital image.

10. The system of claim 8, the first digital image comprising at least some of an object, the second digital image comprising at least some of the object.

11. The system of claim 10, the method comprising aligning the first digital image with the second digital image based upon a feature of the object.

12. The system of claim 8, the method comprising at least one of zooming in to or zooming out of at least some of at least one of the first digital image or the second digital image.

13. The system of claim 12, at least one of the zooming in or the zooming out comprising changing a distance between a desired location and an object comprised in at least one of the first digital image or the second digital image.

14. The system of claim 8, the method comprising cropping at least some of at least one of the first digital image or the second digital image.

15. Non-volatile memory comprising instructions that when executed, perform a method for navigating image data, comprising:
   stacking a sequence of digital images comprising a first digital image and a second digital image, the first digital image corresponding to a first location and the second digital image corresponding to a second location;
   rendering a full view of the first digital image;
   rendering an offset portion of the second digital image, the offset portion of the second digital image based upon a distance between the first location and the second location; and
   panning to the second location, comprising:
      rendering a full view of the second digital image; and
      rendering an offset portion of the first digital image, the offset portion of the first digital image based upon the distance between the first location and the second location.

16. The non-volatile memory of claim 15, the method comprising aligning the first digital image with the second digital image.

17. The non-volatile memory of claim 15, the first digital image comprising at least some of an object, the second digital image comprising at least some of the object.

18. The non-volatile memory of claim 17, the method comprising aligning the first digital image with the second digital image based upon a feature of the object.

19. The non-volatile memory of claim 15, the method comprising at least one of zooming in to or zooming out of at least some of at least one of the first digital image or the second digital image.

20. The non-volatile memory of claim 19, at least one of the zooming in or the zooming out comprising changing a distance between a desired location and an object comprised in at least one of the first digital image or the second digital image.

* * * * *